United States Patent [19]
Glance et al.

[11] 3,938,841
[45] Feb. 17, 1976

[54] RESILIENT BUMPER ASSEMBLY

[75] Inventors: Patrick M. Glance, Plymouth; Marvin A. Maten, Jr., Orchard Lake, both of Mich.

[73] Assignee: Ford Motor Company, Dearborn, Mich.

[22] Filed: Jan. 27, 1975

[21] Appl. No.: 544,599

Related U.S. Application Data

[62] Division of Ser. No. 422,946, Dec. 7, 1973, Pat. No. 3,897,095.

[52] U.S. Cl. ............. 293/71 R; 267/116; 267/122
[51] Int. Cl.² ......................................... B60R 19/08
[58] Field of Search ....... 293/1, 71 R, 71 P, DIG. 2; 267/116, 122, 139, 140, 141, 153; 114/219

[56] References Cited
UNITED STATES PATENTS

| | | | |
|---|---|---|---|
| 278,007 | 5/1883 | Garsed | 293/71 P |
| 3,335,689 | 8/1967 | Hein | 293/71 R |
| 3,741,598 | 6/1973 | Novak et al. | 293/71 P |

*Primary Examiner*—Evon C. Blunk
*Assistant Examiner*—Robert Saifer
*Attorney, Agent, or Firm*—Roger E. Erickson; Keith L. Zerschling

[57] ABSTRACT

A resilient bumper assembly comprising an outer cover, an inner energy absorbing member and a rigid backing member. The front cover is made of an elastic material of low durometer and high elongation capability. The inner energy absorbing member is made of an elastomeric material of a higher durometer. The energy absorbing member has a preformed bellows shape constructed to concentrate bending at predetermined locations.

4 Claims, 7 Drawing Figures

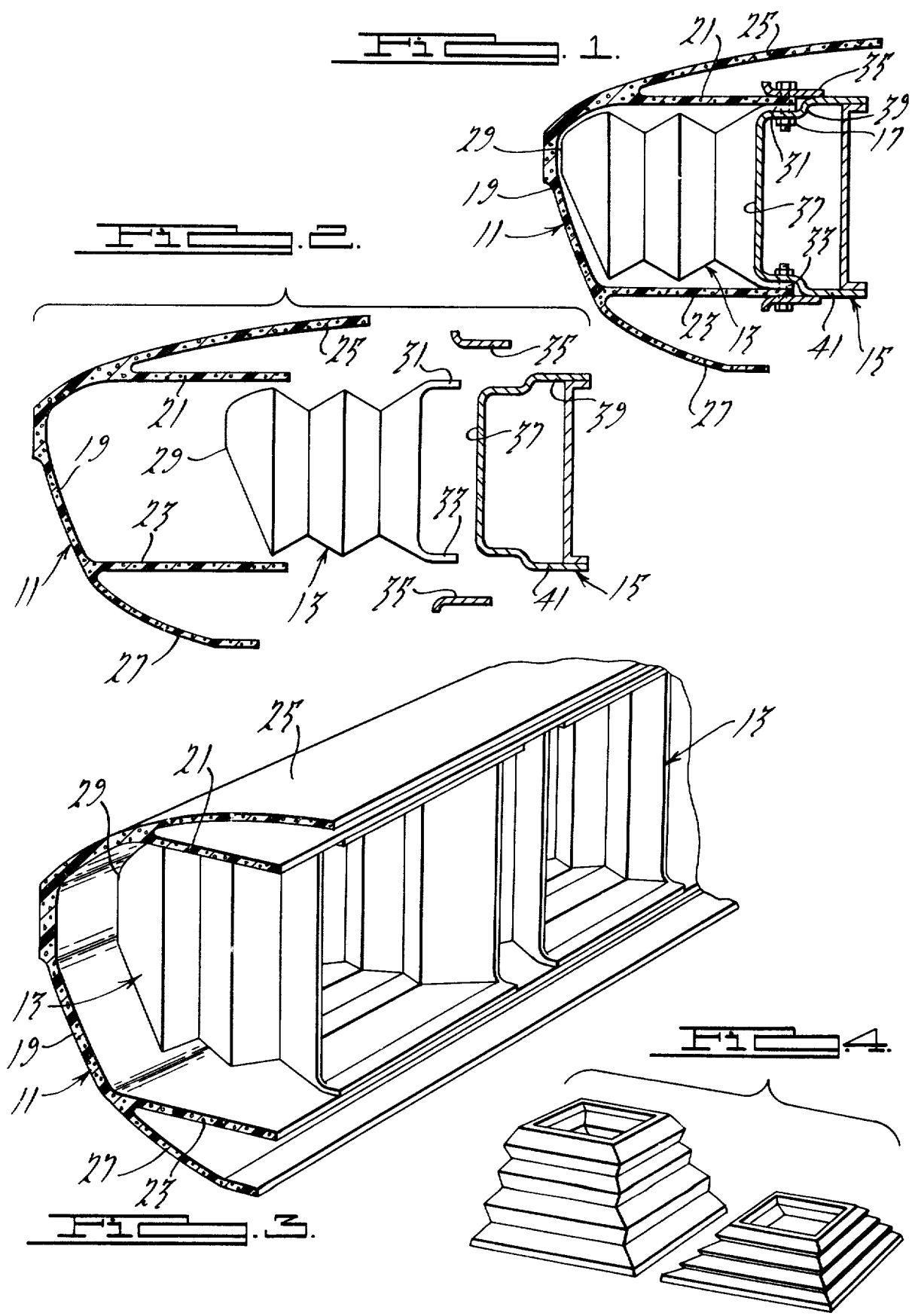

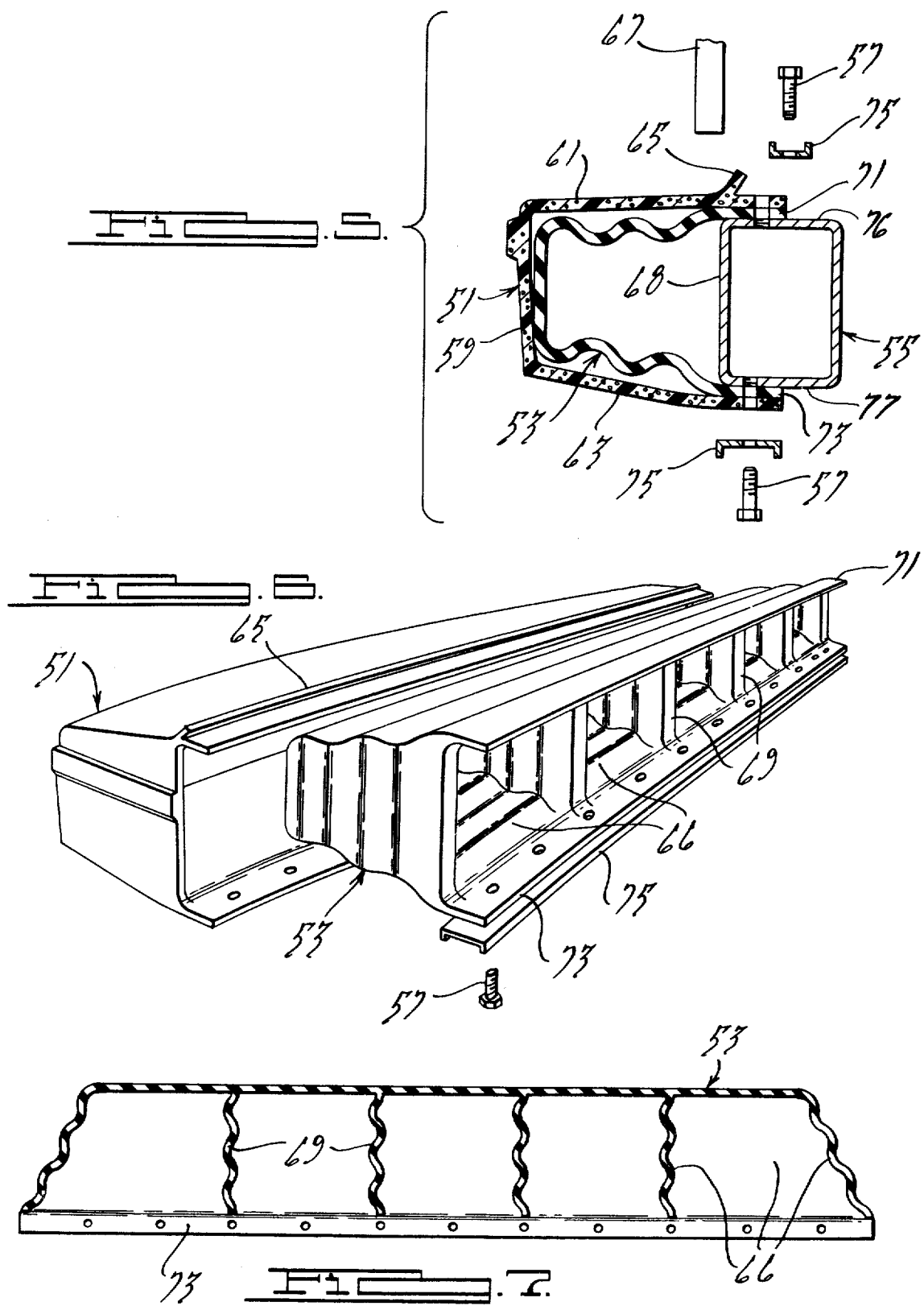

RESILIENT BUMPER ASSEMBLY

This is a division of application Ser. No. 422,946, filed Dec. 7, 1973, now U.S. Pat. No. 3,897,095 issued July 29, 1975.

BACKGROUND AND SUMMARY OF THE INVENTION

Energy absorbing bumper structures for automotive vehicles have been found to be an effective means for reducing damage resulting from low speed collisions. One type of energy absorbing bumper which gives favorable results comprises a hollow elastomeric shell mounted to a rigid backing member. The hollow shell has integrally formed partitions or baffles to increase its stiffness and energy absorbing capacity. Difficulties have been encountered in the selection or development of materials having adequate energy absorption over a necessarily wide range of temperatures and also providing a smooth paintable finish.

Another type of elastomeric bumper known in the art is that having a plastic "egg crate" or honeycomb within an elastomeric cover and mounted to a backing member.

This invention provides an elastomeric bumper construction in which the local stress concentrations induced in the energy absorbing members from an impact are significantly reduced. It also provides a construction in which the energy absorbing members are so designed as to deform along predetermined locations. In addition, the invention provides substantially full recovery of the energy absorbing members following impact. Further, this invention provides an elastomeric bumper assembly having composite materials in which one material suitable for finishing is used on the outer cover and a second material suitable for energy absorption under a variety of temperature conditions is used for the energy absorbing components. Further, this invention provides an elastomeric bumper assembly in which the shape or contours of the exterior surfaces are unaffected by the position and presence of the energy absorbing components.

A resilient bumper assembly constructed in accordance with this invention includes (1) a rigid elongate backing member extending transversely of the automotive vehicle, (2) an elastomeric outer shell secured to the backing member, and (3) separate energy absorbing means received within the outer shell and abutting the backing member. The energy absorbing means include a plurality of elastomeric bellows elements having their axes positioned essentially parallel to the direction of travel of the vehicle.

BRIEF DESCRIPTION OF THE DRAWINGS

FIG. 1 is a transverse cross sectional view of a resilient bumper assembly constructed in accordance with this invention;

FIG. 2 is an exploded view similar to FIG. 1;

FIG. 3 is a perspective view of the elastomeric portions of the bumper assembly viewed at an angle from the rear;

FIG. 4 is a perspective view of modified energy absorbing member configurations;

FIG. 5 is a transverse cross sectional view of an alternate embodiment of the invention;

FIG. 6 is a perspective view of portions of the alternate embodiment view at an angle from the rear;

FIG. 7 is a horizontal cross sectional view of the energy absorber of the alternate embodiment.

DETAILED DESCRIPTION OF A PREFERRED EMBODIMENT

A bumper assembly constructed in accordance with this invention includes three primary components: an outer shell 11, inner energy absorbing means 13 and a bumper backing member or beam 15. The outer shell and the energy absorbing means are secured to the backing member by any suitable fastening means, such as threaded fasteners 17. The backing member is then attached to the motor vehicle frame (not shown).

The outer shell 11 is molded or cast of an elastomeric material into the shape and contour desired by the vehicle designers. The outer shell includes a front wall portion 19 and upper and lower walls 21 and 23, respectively, which extend rearwardly from the front wall portions to the backing member 15. The exterior contour shape of the bumper is completed by upper and lower exterior walls 25 and 27 which also extend rearwardly from the front wall and cover the fastening means 17 and the upper and lower surfaces of the backing member 15.

The outer shell 11 is formed of low durometer material having a high elongation capability. Also, the outer surface material must be smooth and capable of being painted. Materials having been found suitable are urethanes or polyester elastomers.

The energy absorbing means 13 in the preferred embodiment takes the form of a series of rectangular bellow or convoluted boxes. The axis of symmetry about which the convolutions are disposed is perpendicular to the front face of the backing member 15 and essentially parallel with the direction of travel of the vehicle. The bellows have a contoured front face 29 which corresponds with the contour of the inner surface of the front wall 19 of the outer shell. The rear portion of the energy absorbing means 13 includes upper and lower flanges 31 and 33 which extend about front portions of the backing beam 15 between the beam and the end portions of the upper and lower walls 21 and 23 of the outer shell. Threaded fasteners 17 extend through openings formed in the end portions of the outer shell walls and in the flanges of the energy absorbing means 13 and together with clamping strip 35 retain the outer shell and the energy absorbing member to the backing member.

The purpose of the convolutions in the energy absorbing members 13 is to promote a controlled and predetermined manner of bending when an impact results in the collapse of the energy absorbing member. It has been found that recovery of such an energy absorbing member following an impact is substantially better than the recovery of prior art devices such as simple egg crate baffles or honeycomb structures. The energy absorbing member 13 is constructed of an elastomeric material of a relatively high durometer and modulus of elasticity as compared with the outer shell. The member 13 appears to be a rigid member when examined under unimpacted conditions or when significant forces are not applied. The energy absorbing member is preferably of a high durometer natural rubber; however, synthetic rubbers and ethylene propylene diene monomers also may be suitable.

The energy absorbing means may take a variety of bellows configurations in addition to the individual bellows members as shown in FIGS. 1 through 3. Pyramidal shapes, as shown in FIG. 4, may be utilized to accommodate certain contours of bumpers. Such pyramidal bellows would be equally effective in concentrating stresses at predetermined positions within the energy absorbing means. Cylindrical bellows or conical bellows are also suitable. Furthermore, a number of bellows elements may be integrally formed in one horizontally extending unit as is described below.

The backing member 15 is of a welded box beam construction and its upper and lower walls 39 and 41, respectively, contoured to cooperatively receive the edges of the outer shell 11 and the energy absorbing bellows members 13. The front face 37 of the box beam is planar and provides an abutment for the inner ends of the bellows members.

DETAILED DESCRIPTION OF AN ALTERNATE EMBODIMENT

An alternate embodiment of the invention is similar to the preferred embodiment except that the energy absorbing means is an integrally formed series of bellows-like elements. The alternate embodiment also includes three primary components: an outer shell 51, inner energy absorbing means 53 and a bumper backing member or beam 55. The outer shell and the energy absorbing member are secured to the backing member by any suitable fastening means, such as threaded fasteners 57.

The outer shell 11 is molded or cast of an elastomeric material into the shape and contour desired by the vehicle designers. The outer shell includes a front wall portion 59 and upper and lower walls 61 and 63, respectively, which extend rearwardly from the front wall portion to the backing member 55. An upwardly extending sight shield 65 extends from the upper wall 61 to the rear of the vehicle grill 67.

The outer shell 51 is formed of low durometer material having a high elongation capability. Also, the outer surface material must be smooth and capable of being painted. Materials having been found suitable are urethanes or polyester elastomers.

The energy absorbing means 53 in the alternate embodiment takes the form of an integrally molded series of horizontally disposed rectangular bellow-like elements or convoluted boxes 66. Each element 66 shares one or two common walls or partitions 69 with its adjacent element or elements. The axes of symmetry about which the convolutions are disposed are perpendicular to the planar front face 68 of the backing member 55 and essentially parallel with the direction of travel of the vehicle. Alternatively stated, the energy absorbing means is a hollow elongate elastomeric enclosure with convoluted walls and convoluted vertical or transverse partitions dividing the enclosure into a series of compartments. The rear portion of the energy absorbing means 53 opens against the front face 68 of the backing member and includes upper and lower flanges 71 and 73, respectively, which overlie the front portions of the upper and lower walls 76 and 77, respectively, of the backing member 15. Threaded fasteners 57 extend through openings formed in the end portions of the outer shell walls 61 and 63 and in the flanges of the energy absorbing means 53 and together with clamping strip 75 retain the outer shell and the energy absorbing member to the backing member. Tapped holes (not shown) or the equivalent may be provided in the backing member to receive the threaded fasteners 57.

The outer shell 51 and the energy absorbing member 53 are formed of materials of dissimilar physical characteristics or properties as described in the preferred embodiment.

Modifications and alterations will occur to those skilled in the art which are included within the scope of the claims which follow.

We claim:
1. A resilient bumper assembly for an automotive vehicle including:
    a rigid elongate backing member extending transversely of the vehicle,
    an elastomeric outer shell,
    means securing said outer shell to said backing member,
    energy absorbing means received within the outer shell and abutting the backing member,
    said energy absorbing means having convoluted upper and lower walls and convoluted transverse partitions, said upper and lower walls and said partitions forming a plurality of rectangular bellows-like elements positioned side-by-side, each of said element having at least one partition common with its adjoining element, said bellow-like elements having axes parallel to the direction of travel of the vehicle.
2. A resilient bumper assembly for an automotive vehicle including:
    a rigid elongate backing member extending transversely of the vehicle,
    an elastomeric outer shell,
    means securing said outer shell to said backing member,
    energy absorbing means received within the outer shell and abutting the backing member,
    said energy absorbing means defining a hollow enclosure being open against said backing member,
    said energy absorbing means having convoluted walls and convoluted transversely extending partitions dividing said enclosure into a plurality of individual compartments, the walls of each of said compartment comprising rectangular bellows-like elements, each of said element having at least one partition common with its adjoining element, said bellows-like elements having axes parallel to the direction of travel of the vehicle.
3. A resilient bumper assembly according to claim 2, said outer shell and said energy absorbing means constructed of elastomeric materials having different characteristics, said energy absorbing means being formed of material of higher durometer and a higher modulus of elasticity than said outer shell.
4. A resilient bumper assembly for an automotive vehicle including:
    a rigid elongate backing member extending transversely of the vehicle,
    an elastomeric outer shell,
    means securing said outer shell to said backing member,
    energy absorbing means received within the outer shell and abutting the backing member,
    said energy absorbing means including a plurality of elastomeric bellows elements having axes positioned essentially parallel to the direction of travel of the vehicle,
    said energy absorbing means having horizontally disposed rectangular bellows-like elements, adjoining elements having common walls.

* * * * *